United States Patent
Simpson

[11] Patent Number: 5,850,649
[45] Date of Patent: Dec. 22, 1998

[54] FISHING TOOL

[76] Inventor: Julius Ray Simpson, 975 N. Oliver Rd., Belle Plaine, Kans. 67013

[21] Appl. No.: 895,099

[22] Filed: Jul. 16, 1997

[51] Int. Cl.⁶ .................................................. A01K 69/00
[52] U.S. Cl. .................................. 7/106; 81/418; 81/426
[58] Field of Search .......................... 7/106, 418, 424.5, 7/426; 81/426.5, 9.41; 43/4

[56] References Cited

U.S. PATENT DOCUMENTS

| | | | |
|---|---|---|---|
| Re. 26,687 | 10/1969 | Kelly | 81/9.41 |
| 2,753,741 | 7/1956 | Riley | 7/106 |
| 3,597,775 | 8/1971 | McCasland | 7/106 |
| 4,208,749 | 6/1980 | Hermann et al. | 7/106 |
| 4,631,855 | 12/1986 | Ader | 7/106 |
| 4,899,482 | 2/1990 | Gerdes | 43/4 |
| 5,136,744 | 8/1992 | Allsop et al. | 7/106 |
| 5,207,012 | 5/1993 | Lael | 7/106 |
| 5,207,014 | 5/1993 | Panella | 7/106 |
| 5,557,874 | 9/1996 | Pietrandrea et al. | 7/106 |

OTHER PUBLICATIONS

"Angler's Pliers" of Emcee Manufacturing Co., Apr. 1950.

Primary Examiner—David A. Scherbel
Assistant Examiner—Joni B. Danganan
Attorney, Agent, or Firm—Kenneth H. Jack

[57] ABSTRACT

A fishing tool comprising a first pivoting member having a forward end and a rearward end, the forward end forming a first jaw, and the rearward end forming a first handle; a second pivoting member having a forward end and a rearward end, the forward end forming a second jaw, and the rearward end forming a second handle, the second pivoting member being pivotally attached to the first pivoting member so that as the first handle pivots toward the second handle, the first jaw pivots toward the second jaw; and a pin having a base end and a jig eye clearing end, the base end of the pin being fixedly attached to the first jaw, the pin being positioned upon and aligned with respect to the first jaw so that the jig eye clearing end of the pin extends toward the second jaw upon such pivoting motion of the first jaw toward the second jaw; the second jaw having a pin receiving channel, the pin receiving channel being fitted, positioned, and aligned for receiving the pin upon further pivoting motion of the first jaw toward the second jaw.

19 Claims, 4 Drawing Sheets

FISHING TOOL

FIELD OF THE INVENTION

This invention relates to fisherman's hand tools. In particular this invention relates to fisherman's hand tools which assist in utilization, configuration, and manipulation of fishing lures, lead sinkers, hooks, and fishing line.

BACKGROUND OF THE INVENTION

A common ball head jig comprises a fish hook having an eye at its upper end, a shank section extending downward from its upper end, and a U-shaped bend at its lower end, the bend terminating at a barbed point. The shank of the ball head jig typically is bent near its upper end at approximately 90°, causing the eye to extend perpendicularly from the shank in the direction of the gap of the hook. The upper end of the hook typically is embedded within a lead ball, the lead ball being sized so that the eye extends outwardly from its outer spherical surface. The lead ball typically has a cylindrical step extending downward in axial alignment with the shank of the hook. Typically the lead ball is painted a bright color such as yellow, which is found to be enticing to fish and a pair of eyes are painted on either side of the lead ball. A skirt of feather or other fibrous materials typically is tied to the cylindrical section extending downward from the lead ball, the skirt enshrouding the hook, and mimicking the fins of a fish. The process of painting the lead ball often paints over the eye. Dried paint clogging the eye, prevents the eye from being utilized for tying the jig onto a fishing line.

To utilize such a jig, a fisherman typically grasps the jig in one hand, and grasps a second jig in the other hand. The fisherman then utilizes the point of the second jig to gouge paint out of the eye of the first jig. The fisherman then threads the end of a fishing line through the eye and ties a knot securing the jig to the line. Typically excess line is present upon tying such a knot. In order to remove such excess line, the fisherman typically utilizes a knife or scissors to cut away the excess line. Commonly it is desirable to attach split shot sinkers to the fishing line a short distance above the jig, providing additional weight for effective spin casting. In order to press such split shot sinkers onto the line the fisherman typically must either bite the split shot sinkers between his teeth or utilize pliers for pressing the sinkers. Often, the barbed point of the jig is in need of sharpening. In order to sharpen such points a fisherman typically utilizes a whetstone.

Utilization of a second jig, pliers, a knife, scissors, and a whetstone for readying a jig for fishing presents significant problems for a fisherman. The process of putting down and picking up and using such various implements is time consuming, and utilization of such various implements increases the risk that any one of them will be lost or misplaced. Additionally, a fisherman fishing from a standing position in a boat and having implements such as pliers and whetstone in the hull of the boat, has additional difficulty using such implements. Additionally, acquiring and assembling such an assortment of implements is expensive and uneconomical.

The instant invention solves the above described problems by providing a single fishing tool which is easily hung around a fisherman's neck by a tether or clipped to a belt loop and which is capable of clearing jig eyes, sharpening hooks, cutting fishing line, and pressing split shot sinkers.

PRIOR ART PATENTS

U.S. Pat. No. 4,899,482 issued Feb. 13, 1990, to Gerdes discloses a surgical hemostat adapted for disgorging hooks from the mouths of fish.

U.S. Pat. No. 4,208,749 issued Jun. 24, 1980 to Hermann discloses pliers adapted for molding and punching holes through lead sinkers.

U.S. Pat. No. 2,753,741 issued Jul. 10, 1956, to Riley discloses pliers adapted for forming split shot sinkers.

U.S. Pat. No. 5,207,012 issued May 4, 1993 to Lael discloses pliers whose handles are adapted for holding and retaining sinkers and hooks.

U.S. Pat. No. 5,557,874 issued Sep. 24, 1996 to Pietrandrea, et al. discloses a surgical hemostat modified for use in fishing.

U.S. Pat. No. 5,207,014 issued May 4, 1993 to Panella discloses a multipurpose fishing tool.

U.S. Pat. No. 4,796,318 issued Jan. 10, 1989 to Bigej discloses multi-purpose fisherman's pliers.

U.S. Pat. No. 4,631,855 issued Dec. 30, 1996 to Ader discloses fisherman's hook disgorging pliers.

U.S. Pat. No. 2,531,522 issued Nov. 28, 1950 to Malouf discloses multi-purpose fisherman's pliers.

U.S. Pat. No. 2,920,514 issued Jan. 12, 1960 to McKeehan discloses fisherman's pliers having a storage chamber within its handle.

None of the above disclosed U.S. Patents teaches or describes the novel, useful, inventive and unique aspects, features and elements of the present invention.

SUMMARY OF THE INVENTION

The present inventive fishing tool comprises a pair of handles pivotally attached near their forward ends, the forward ends of the handles forming a pair of opposing jaws. Preferably the pivotal attachment of the handles comprises a round headed rivet passing through rivet receiving apertures within and through the handles. At the forward end of the upper jaw of the fishing tool is affixed a downwardly extending pin or spike, and an upwardly opening jig eye receiving recess is milled into the forward end of the lower jaw, the recess having a pin receiving channel extending downwardly therefrom and extending through the lower jaw. Preferably the lower surface of the upper jaw is milled to form a fishing line cutting blade, such milled section being located upon the upper jaw of the pin. The milled blade is preferably shaped and positioned so that its cutting edge may come into to contact with the upper surface of the lower jaw, allowing the tool to cut a fishing line placed between the upper surface of the lower jaw and the cutting edge of the blade. Also, preferably, to the rear of the fishing line cutting blade are upwardly opening and downwardly opening split shot sinker pressing recesses which allow the tool to be utilized to press split shot sinkers onto a fishing line. Also preferably a whetstone is fixedly attached by an adhesive to one of the handles of the tool for sharpening ball head jig points.

In operation, the present inventive fishing tool is utilized to clear paint from the eye of a ball head jig by placing the eye within the jig eye receiving recess and by squeezing the handles of the tool together. Pivotal motion of the handles towards each other drives the jaws of the tool together, driving the pin through the eye, and clearing any paint clogging the eye. After performing such operation on a jig eye, the jig may be tied to a fishing line and excess line may be trimmed by utilizing the tool's cutting blade. The tool may then be utilized to press split shot sinkers onto the fishing line by placing the fishing line into the open slot of split shot sinker, lacing the split shot sinker between the semi-circular recesses within the jaws of the tool and by manipulating the handles of the tool to cause the jaws and recesses to press the split shot inward upon the fishing line. In the event the point of the jig's hook needs sharpening, the whetstone affixed to the handle of the tool may be utilized to sharpen the hook. Apertures at the rear of the handle of the tool allow the tool to be suspended by a tether from a fisherman's neck or attached by a clip to a fisherman's belt or belt loop.

An alternate configuration of the present inventive fishing tool provides a series of progressively sized pins extending from the upper jaw, each being in opposing alignment with a series of progressively sized jig eye receiving recesses within the lower jaw. Each jig eye receiving recess of the alternate configuration preferably is fitted for securely receiving and holding a commonly sized jig eye, and each pin preferably is fitted for insertion through the opening of a commonly sized jig eye. Such progressive sizing of the jig eye receiving recesses and pins assures that the fishing tool may be easily utilized for clearing paint from the eyes of a variety of commonly sized jigs.

Accordingly, it is an object of the present invention to provide a fishing tool having a jig eye clearing pin and means for driving such pin through the eye of a jig for clearing paint from the eye of such jig.

It is a further object of the present invention to provide such a tool further having a jig eye receiving recess for securely holding and retaining a jig eye while such pin is driven through the jig eye.

It is a further object of the present invention to provide such a tool further having a fishing line cutting blade.

It is a further object of the present invention to provide such a tool further having a pair of opposing split shot sinker pressing recesses for pressing split shot sinkers onto a fishing line.

It is a further object of the present invention to provide such a tool further having attached thereto a whetstone for sharpening the points of fish hooks.

It is a further object of the present invention to provide such a tool further having a series of progressively sized pins and a series of progressively sized jig eye receiving recesses, allowing the eyes of various commonly sized jigs to be easily and conveniently cleared.

Other and further objects, benefits and advantages of the present invention will become known to those skilled in the art upon review of the detailed description which follows, and upon review of the appended drawings.

DETAILED DESCRIPTION OF THE PREFERRED EMBODIMENT

Figure 1:
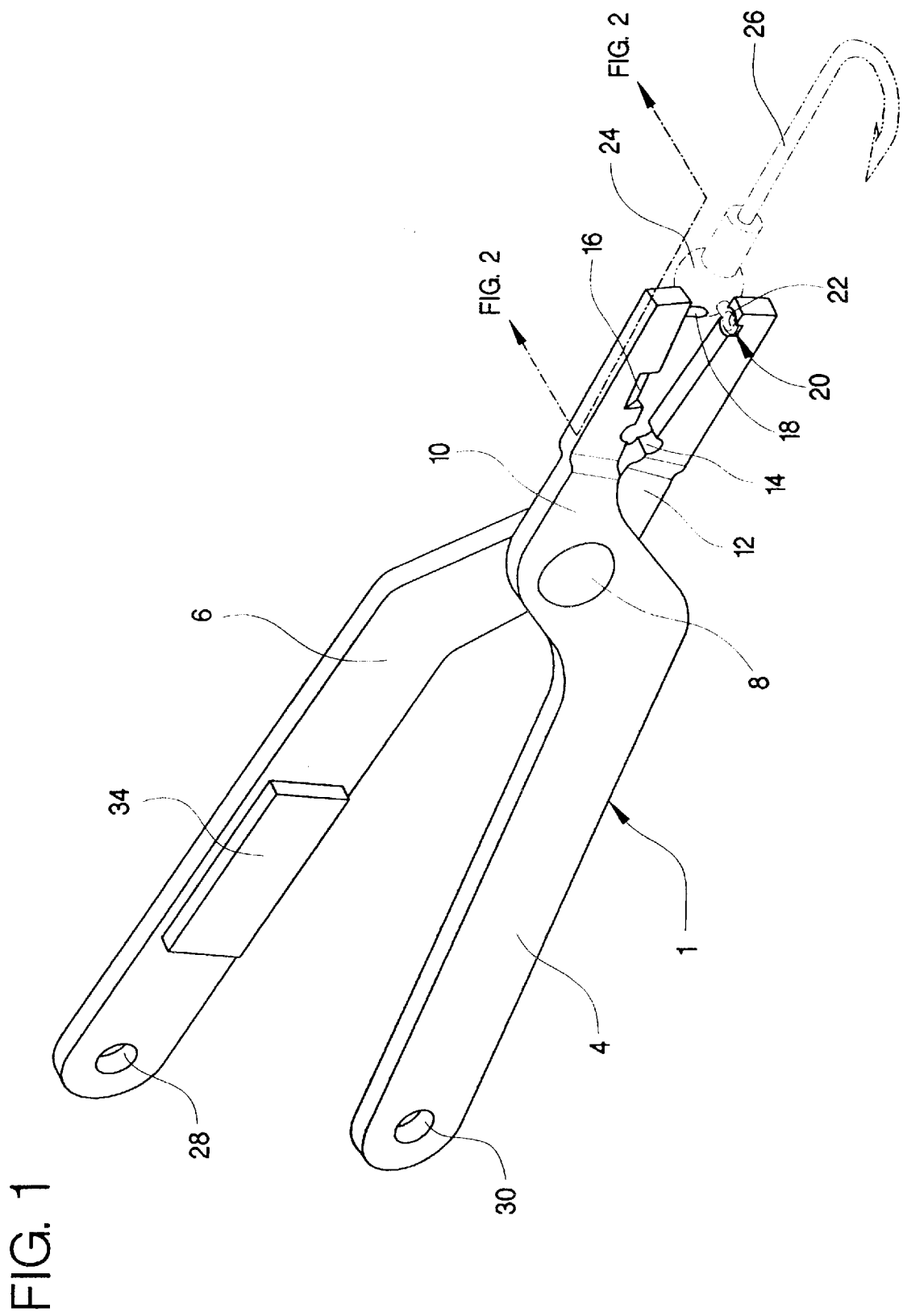
FIG. 1 is an isometric view of the present invention.
Figure 2:
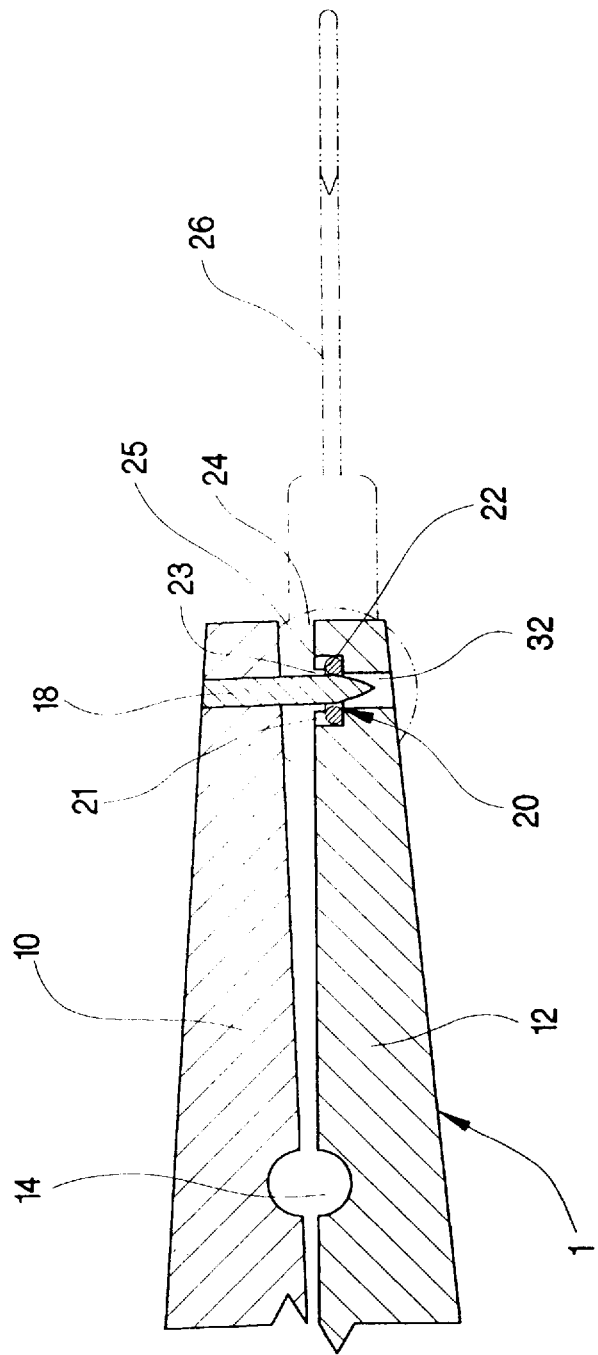
FIG. 2 is a sectional view of the jaws of the present invention.

Referring now to the drawings and in particular to FIG. 1, the fishing tool 1 comprises an upper handle 6 and a lower handle 4, the upper handle 6 and the lower handle 4 being pivotally attached to each other by a round headed rivet or bolt 8. The forward end of the lower handle 4 further extends upwardly and forwardly to form an upper jaw 10, and the forward end of the upper handle 6 forwardly and downwardly extends to form an opposing lower jaw 12. Referring simultaneously to FIGS. 1 and 2, a circular pin 18 is embedded within the upper jaw 10, the pin 18 extending downwardly from the lower surface of the upper jaw 10. Also referring simultaneously to FIGS. 1 and 2, the lower jaw 12 is milled to form a jig eye recess designated by arrow 20 and a pin receiving channel 32. The jig eye recess 20 comprises a forward arcuately curved wall 25 and a rearward arcuately curved wall 21. The forward and rearward arcuately curved walls 25 and 21 are separated by laterally opening jig eye extension slots 23. The jig eye extension slots allow a shaft 27 of a jig eye 22 to extend laterally from the side wall of the lower jaw 12, and allow the jig eye 22 to rest upon the floor of the jig eye recess 20. Referring to FIG. 1 the upper jaw 10 is milled to form a fishing line cutting blade 16 whose cutting edge comes into contact with the upper surface of the lower jaw 12 upon closure and contact of the upper jaw 10 with the lower jaw 12. Rearward of the fishing line cutting blade 16 are opposing split shot sinker pressing recesses 14. Fixedly attached to the upper handle 6 is a whetstone 34 for sharpening the points of jigs. At the rearward ends of the upper handle 6 and the lower handle 4 are apertures 28 and 30 respectively, such apertures allowing the fishing tool 1 to be hung from a tether or a clip.

Referring to FIG. 1, in operation of the fishing tool 1 a fisherman's left hand grasps the upper handle 6 and the lower handle 4 so that the upper handle 6 biases against the palm of the fisherman's left hand, while the lower handle 4 biases against the fingers of that hand. With the fishing tool 1 so held, the upper handle 6 and the lower handle 4 are manipulated slightly apart, causing the upper jaw 10 and the lower jaw 12 to move away from each other until the lower end of the pin 18 rises above the upper surface of the lower jaw 12. With the fishing tool 1 so positioned a jig 26 having the eye 22 and a lead ball head 24 is positioned so that the eye 22 rests within the interior space of the jig eye recess 20. Upon such positioning of the jig 26 the operator's hand squeezes toward each other the upper handle 6 and the lower handle 4, causing the upper jaw 10 and the lower jaw 12 to move together, driving the pin downward through the interior space of the eye 22 and thence further downward, referring to FIG. 2, into and through the pin receiving channel 32. The action of the pin 18 driven through the eye 22 of the jig 26 perforates dried paint which may clog the eye 22 allowing the eye to be utilized for tying a fishing line to the jig.

Typically, upon tying a fishing line to a jig some amount of excess fishing line extends from the knot attaching the line to the eye. Referring to FIG. 1, such excess fishing line may be trimmed by laying such fishing line over the upper surface of the lower jaw 12 at a position underlying the milled cutting blade 16. Upon so positioning the fishing line, the lower handle 4 and the upper handle 6 may be squeezed toward each other causing the blade 16 to drive downward onto the fishing line, cutting the fishing line.

Referring to FIG. 1, it is often desirable to sharpen the point of a jig 26 prior to using the jig for fishing. The whetstone 34 fixedly attached to the handle 6 by means of an adhesive may be conveniently utilized for sharpening the points of such jigs.

Where as small ball headed jig is tied to the end of a fishing line, the jig may not have sufficient weight to allow a fisherman to cast the jig a sufficient distance into the water. A common means of adding additional weight to a fishing line for casting is pressing split shot lead sinkers onto the line. Referring to FIG. 1 the fishing tool 1 may be utilized to press such split shot lead sinkers onto a fishing line by inserting the fishing line into the "V" groove of split shot sinker, by placing the split shot sinker between the spit shot sinker pressing recesses 14, and by manipulating the handles 4 and 6 to cause the upper and lower jaws 10 and 12 to press upon the split shot sinker, securing the split shot sinker onto the fishing line.

Figure 3:
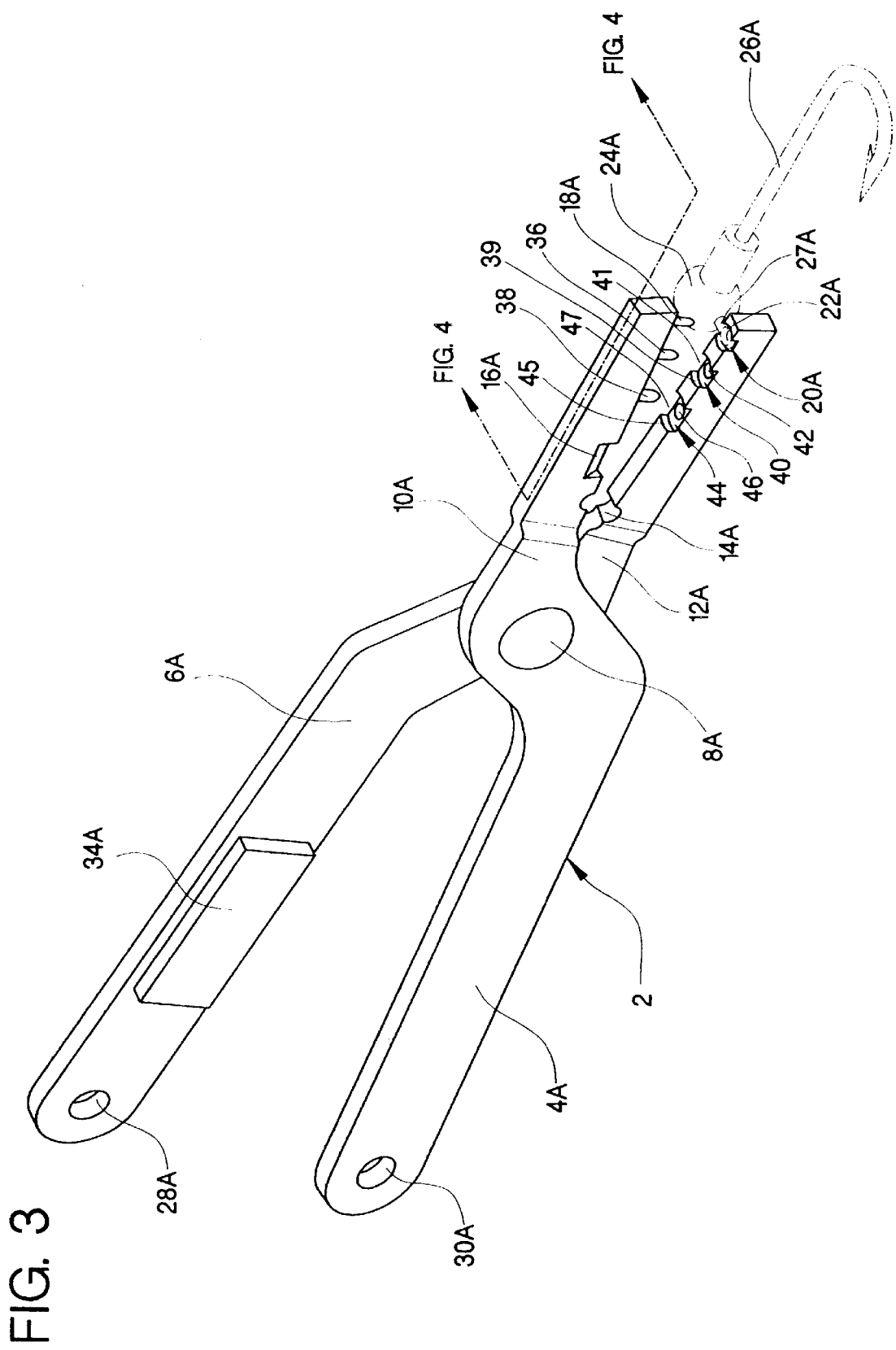
FIG. 3 is an isometric view of an alternate configuration of the present invention.
Figure 4:
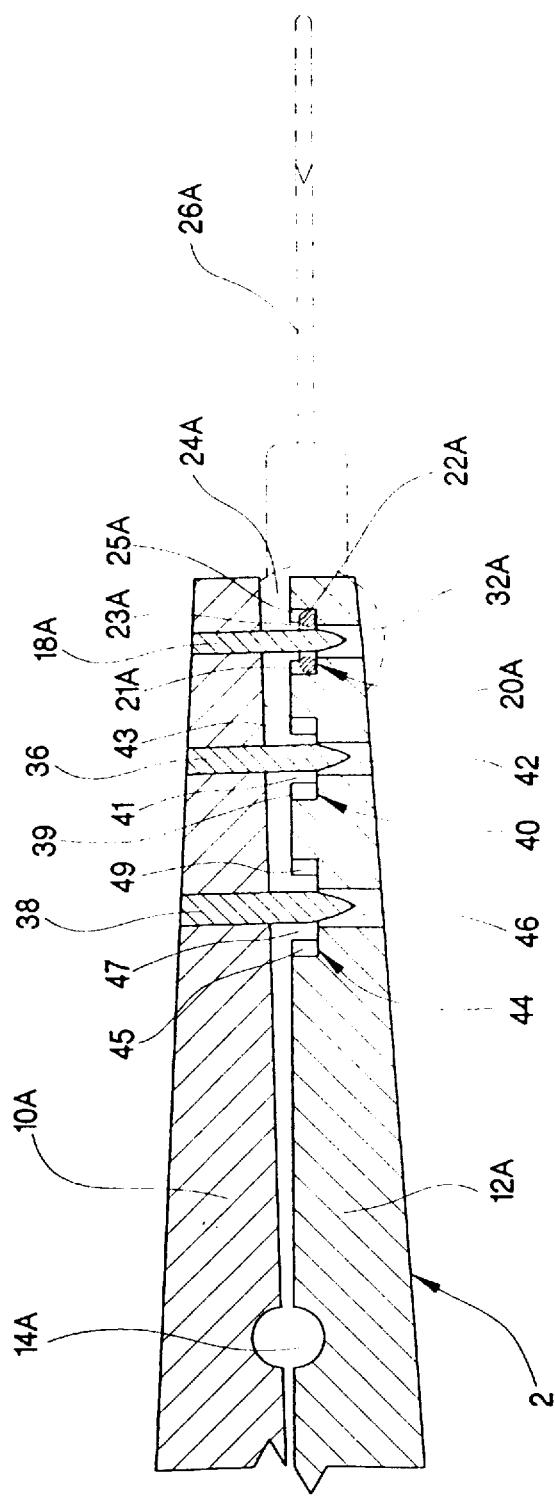
FIG. 4 is a sectional view of the jaws of the alternate configuration of the present invention.

Referring simultaneously to FIGS. 3 and 4 the fishing tool 2 is identical to the fishing tool 1 depicted in FIGS. 1 and 2 with the additions of pins 36 and 38, jig eye recesses designated by arrows 40 and 44, pin receiving channels 42 and 46 forward arcuately curved walls 49 and 43, rearward arcuately curved walls 45 and 39, and jig eye extension slots 47 and 41. The most commonly used ball headed jigs come in three known sizes, resulting in varying sizes of jig eyes and jig eye openings. Circular pins 18A, 36, and 38 are fitted to match the internal diameters of the three sizes of eyes of jigs, and jig eye recesses 20A, 40, and 44 are fitted for receiving the outside diameters of the eyes of three sizes of jigs. Operation of the fishing tool 2 is essentially the same as operation of the fishing tool 1 depicted in FIGS. 1 and 2 except that the step of placing the jig eye 22A within a jig eye receiving recess includes selectively determining which jig eye receiving recess, 20A, 40, or 44 will be utilized. By selecting the properly sized jig eye receiving recess the jig eye 22 is thereby more securely held so that the interior space of the jig eye underlies a pin, 18A, 36, or 38, as the case may be, and so that the interior space of the jig overlies a pin receiving channel, referring to FIG. 4, 32A, 42, or 46, as the case may be.

Having illustrated and described the principals of my invention by what is presently, a preferred embodiment thereof, and an alternate embodiment, it should be apparent that such embodiments may be modified in arrangement and detail without departing from such principals. I claim all such modifications within the true spirit and scope of the following claims.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A fishing tool comprising:

(a) a first pivoting member having a forward end and a rearward end, the forward end forming a first jaw and the rearward end forming a first handle;

(b) a second pivoting member having a forward end and a rearward end, the forward end forming a second jaw, and the rearward end forming a second handle, the second pivoting member being pivotally attached to the first pivoting member so that as the first handle pivots toward the second handle, the first jaw pivots toward the second jaw;

(c) a pin having a base end and a jig eye clearing end, the base end of the pin being fixedly attached to the first jaw, the pin being positioned upon and aligned with respect to the first jaw so that the jig eye clearing end of the pin extends toward the second jaw upon such pivoting motion of the first jaw toward the second jaw; the second jaw having a pin receiving channel, the pin receiving channel being fitted, positioned, and aligned for receiving the pin upon further pivoting motion of the first jaw toward the second jaw; and (d) a jig eye recess within the second jaw, the jig eye recess having a forward arcuately curved wall, a rearward arcuately curved wall, and having a jig eye extension slot separating the forward and rearward arcuately curved walls, the jig eye recess being fitted for receiving and retaining the eye of a ball head jig, the jig eye recess being positioned upon and aligned with respect to the second jaw so that upon placement of the eye of the ball head jig within the jig eye recess, and upon further pivoting motion of the first jaw toward the second jaw, the jig eye clearing end of the pin may pass through the eye, clearing obstructions there across, and allowing the eye to be utilized for attachment of fishing line.

2. The fishing tool of claim 1 further comprising a plurality of second pins, each second pin having a base end and a jig eye clearing end, each second pin being positioned upon and aligned with respect to the first jaw so that its jig eye clearing end extends toward the second jaw upon such pivoting motion of the first jaw toward the second jaw; the second jaw having a plurality of second pin receiving channels, each second pin receiving channel being fitted, positioned, and aligned for receiving a second pin upon such further pivoting motion of the first jaw toward the second jaw.

3. The fishing tool of claim 2 wherein the second jaw has a plurality of second jig eye recesses each second jig eye recess having a forward arcuately curved wall, a rearward arcuately curved wall, and having a jig eye extension slot separating the forward and rearward arcuately curved walls, each jig eye recess being fitted for receiving and retaining the eye of a ball head jig, each second jig eye receiving recess being positioned upon and aligned with respect to the second jaw so that upon placement of the eye of the ball head jig within such recess and upon such further pivoting motion of the first jaw toward the second jaw, the jig eye clearing end of a second pin may pass through the eye, clearing obstructions thereacross, and allowing the eye to be utilized for attachment of fishing line.

4. The fishing tool of claim 3 wherein the lateral cross sectional shapes of the pin and second pins are circular, and wherein the diameters of the pin and second pins vary in accordance with the inside diameters of the eyes of common sizes of ball head jigs.

5. The fishing tool of claim 4 wherein the widths of the jig eye recess and the second jig eye recesses vary in accordance with the outside diameters of the eyes of common sizes of ball head jigs.

6. The fishing tool of claim 5 wherein the forward end of the first pivoting member or the forward end of the second pivoting member further forms fishing line cutting means.

7. The fishing tool of claim 6 wherein the fishing line cutting means comprises a knife edge.

8. The fishing tool of claim 5 wherein in the forward ends of the first pivoting member and the second pivoting member further form split shot sinker pressing means.

9. The fishing tool of claim 8 wherein the split shot sinker pressing means comprises a downwardly opening, semicircular indentation within the first jaw and an upwardly opening semicircular indentation within the second jaw, the upwardly and downwardly opening semicircular indentations being positioned and aligned with respect to each other so that as the first jaw pivots toward the second jaw, the interior surfaces of such indentations may press against opposing sides of a split shot sinker placed there between, may compress the spit shot sinker, and may affix the split shot sinker to a fishing line extending through the split shot sinker.

10. The fishing tool of claim 5 further comprising a whetstone fixedly attached to the first handle or to the second handle, the whetstone being capable of sharpening the point of the hook of a ball head jig.

11. The fishing tool of claim 5 wherein the first pivoting member has a first rivet receiving aperture therethrough, wherein second pivoting member has a second rivet receiving aperture therethrough, and wherein the pivotal attachment of the first pivoting member to the second pivoting member comprises a rivet extending through the first and second rivet receiving apertures.

12. The fishing tool of claim 5 wherein the first pivoting member has a first bolt receiving aperture therethrough, wherein the second pivoting member has a second bolt receiving aperture therethrough, and wherein the pivotal attachment of the first pivoting member to the second pivoting member comprises a bolt passing through the first and second bolt receiving apertures.

13. The fishing tool of claim 1 wherein the forward end of the first pivoting member or the forward end of the second pivoting member further forms fishing line cutting means.

14. The fishing tool of claim 13 wherein the fishing line cutting means comprises a knife edge.

15. The fishing tool of claim 1 wherein the forward ends of the first pivoting member and the second pivoting member further form split shot sinker pressing means.

16. The fishing tool of claim 15 wherein the split shot sinker pressing means comprises a downwardly opening, semicircular indentation within the first jaw and an upwardly opening semicircular indentation within the second jaw, the upwardly and downwardly opening semicircular indentations being positioned and aligned with respect to each other so that as the first jaw pivots toward the second jaw, the interior surfaces of such indentations may press against opposing sides of a split shot sinker placed there between, may compress the spit shot sinker, and may affix the split shot sinker to a fishing line extending through the split shot sinker.

17. The fishing tool of claim 1 further comprising a whetstone fixedly attached to the first handle or to the second handle, the whetstone being capable of sharpening the point of the hook of a ball head jig.

18. The fishing tool of claim 1 wherein the first pivoting member has a first rivet receiving aperture therethrough, wherein second pivoting member has a second rivet receiving aperture therethrough, and wherein the pivotal attachment of the first pivoting member to the second pivoting member comprises a rivet extending through the first and second rivet receiving apertures.

19. The fishing tool of claim 1 wherein the first pivoting member has a first bolt receiving aperture therethrough, wherein the second pivoting member has a second bolt receiving aperture therethrough, and wherein the pivotal attachment of the first pivoting member to the second pivoting member comprises a bolt passing through the first and second bolt receiving apertures.

* * * * *